Feb. 7, 1933.  A. A. VAN WINKLE  1,896,432
PROTRACTOR
Filed Feb. 5, 1930
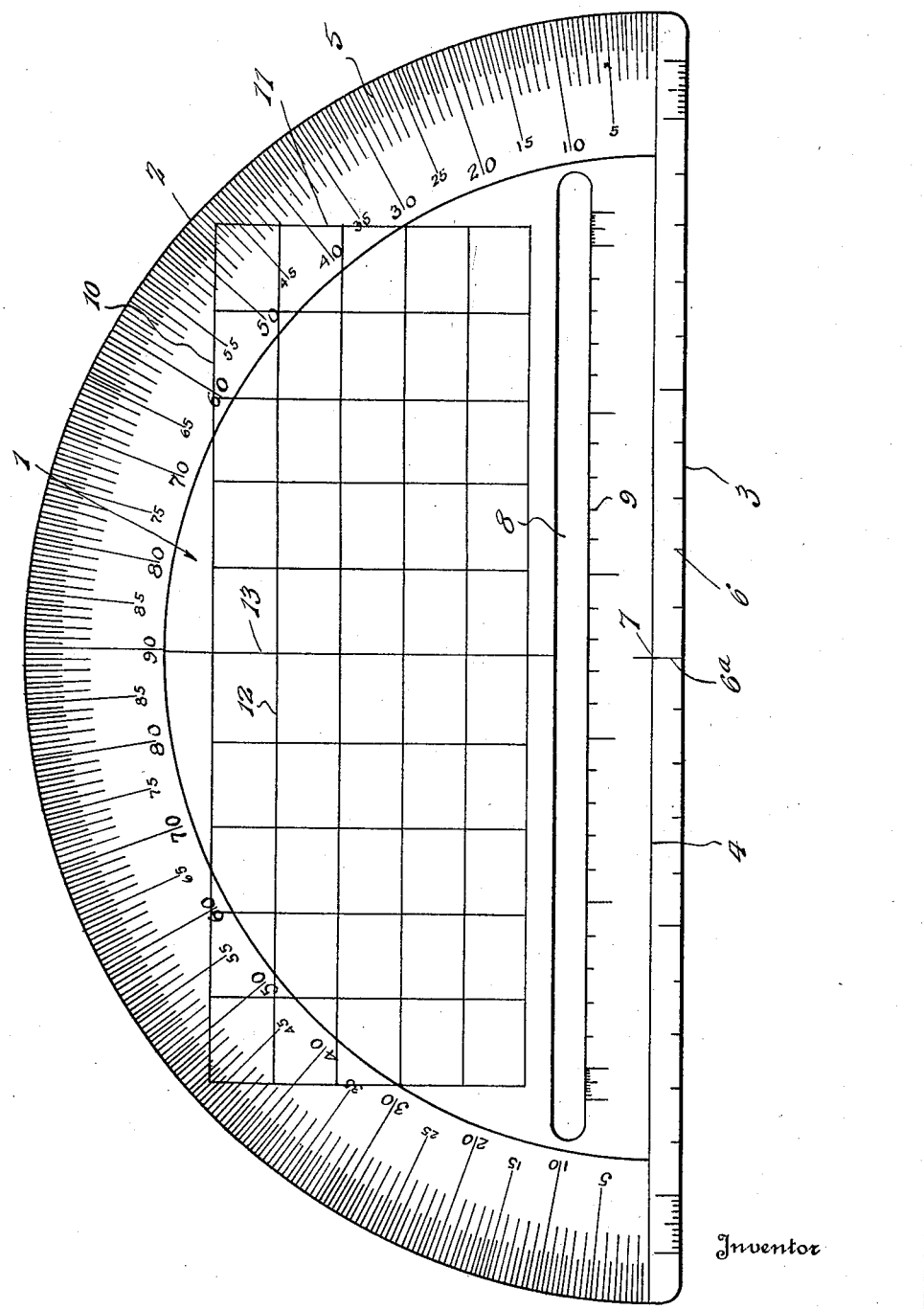
Inventor
Arthur A. Van Winkle.
By *Lacey & Lacey*, Attorneys Patented Feb. 7, 1933

1,896,432

UNITED STATES PATENT OFFICE

ARTHUR A. VAN WINKLE, OF OWENSBORO, KENTUCKY

PROTRACTOR

Application filed February 5, 1930. Serial No. 426,140.

This invention relates to improvements in protractors and scales and has as its general object to provide an instrument of this class embodying a novel arrangement of different scales such as to enable the user to employ the protractor in many different ways and with greater facility and to better advantage than is possible in the use of the ordinary protractor.

Another object of the invention is to provide a protractor which will particularly recommend itself for use in plotting land in accordance with different surveys of the same land and different units of measurement, the scales of the protractor being so arranged and of such character that different units of measurement upon which different surveys are based may, by the use of the protractor, be reduced to the same scale whereby to permit, for example, the plotting of a piece of land in feet or chains to produce a map of the same scale as one plotted in poles, etc.

Another object of the invention is to provide an instrument of this class by the employment of which the acreage of a piece of land may be determined by application of the instrument to a plat drawn to a predetermined scale.

The figure of the accompanying drawing is a plan view of the plotting instrument embodying the invention and said instrument is preferably made from xylonite or other transparent material suitable for the purpose. The body of the instrument 1 is provided with an arcuate marginal portion 2 and a chordal margin 3 which extends between the ends of the arcuate margin 2, the angular extent of the margin 2 being somewhat greater than 180°. There is impressed upon the upper face of the body 1 a base line indicated by the numeral 4, which line extends parallel to the chordal margin or edge 3 of the body and the ends of which line constitute the zero marks of a protractor scale 5 which is likewise impressed upon the said upper face of the body, this scale extending, as usual, along the arcuate edge 2 and ranging, in the order of its scale marks and their proper designations, from "0" to the "90°" mark which is located midway between the ends of the base line 4.

The numeral 6 indicates a linear scale consisting of suitable scale marks impressed upon the upper face of the plate along the margin 3 and between said marginal edge and the base line 4, and this scale 6 may be representative of any desired units of measurement, this being determined by the manufacturer or by the demands of the purchaser. In any event, it is preferable that the mark of the scale 6 which is precisely midway between the ends of the scale and which is indicated by the reference numeral 6ª be extended to intersect the base line 4 so as to define a center point 7 to which the edge 2 is concentric.

The numeral 8 indicates a slot which is formed in the body 1 of the instrument and the walls of this slot are parallel to each other and likewise parallel to the base line 4 and the edge 3 of the said body, the slot extending, in the body 1, in proximity to the said base line 4. Impressed in the upper face of the body and extending along one side of the slot 8 is a scale 9 for linear measurement which scale may constitute scale marks representative of units and fractions of units of linear measurement based on some scale of measurement other than that upon which the scale 6 is based. In the illustrated embodiment of the invention, the scale 9 extends along the lower side of the slot 8 or, in other words, along that side which is next adjacent the base line 4, but if found desirable, it may be positioned at the opposite side of the said slot, or scales based on different systems of measurement may be arranged at opposite sides of the slot, thereby adding an additional scale to the instrument. The walls of the slot, of course, constitute straight edges, and the said slot 8 is located wholly within the bounds of the protractor scale 5 and in no way interferes therewith.

All of the scales heretofore referred to are impressed upon one face of the body 1, which may be considered the upper face of said body. As previously stated, it is one object of the invention to provide means whereby the acreage of a piece of land may be determined by applying the instrument to a map drawn to a predetermined scale, and in order that this may be accomplished, there are impressed in the under face of the body 1, within a rectangular area defined by respectively parallel lines 10 and 11, a number of horizontal and vertical lines 12 and 13 respectively parallel to the lines 10 and 11, and said lines 12 are equi-distantly spaced as are also the lines 13, the two series of lines intersecting as shown in the drawing. As the body 1 is transparent, this divided area will have its divisions presented to view through the said body, and each division of the area, as defined by the intersecting lines 12 and 13 and, in proper instances, by the border lines 10 and 11, will represent, for example, an acre of ground. Of course, each division may be representative of more than an acre or, in other words, some multiple of an acre, or the number of the intersecting lines 12 and 13 may be increased and their relative spacing correspondingly decreased, depending upon the scale of the map for application to which the instrument is designed.

From the foregoing description of the invention it will be seen that there is provided an instrument of the class described which may be employed with great convenience and accuracy in plotting and in which instrument the arrangement of the various scales is such that there will be no mutual interference and, at the same time, the instrument is, by reason of the number and arrangement of such scales, adapted for employment in various ways for which the ordinary protractor is not adapted.

Having thus described the invention, what I claim is:

A plotting instrument comprising a body of transparent material having an arcuate edge and a chordal edge, said body having a base line upon one face parallel to the chordal edge and spaced therefrom, the said body being further provided upon its upper face with a protractor scale extending along the arcuate edge thereof between the ends of the base line whereby the said ends of the base line will constitute the zero scale marks of said protractor scale, the face of the body having a linear scale impressed thereon and extending along said chordal edge and beneath the ends of the protractor scale, the under face of the body having a rectangular border delineated thereon and defining a rectangular area partially intersecting the protractor scale and provided with intersecting lines parallel with the border lines to define within the border divisions of said area, said body having a slot extending within the bounds of the protractor scale, one wall of the slot constituting a straight edge disposed parallel with the lower edge of the rectangular border and the other wall of the slot being parallel with the base line and adjacent thereto, the upper face of the body between the lower wall of the slot and said base line bearing a linear scale, the scale at the chordal edge of the instrument having division marking one of which extends inwardly in crossed relation to the base line at the center of said scale.

In testimony whereof I affix my signature.

ARTHUR A. VAN WINKLE. [L. S.]